US008750374B2

(12) United States Patent
Kleijn et al.

(10) Patent No.: US 8,750,374 B2
(45) Date of Patent: Jun. 10, 2014

(54) CODING AND DECODING OF SOURCE SIGNALS USING CONSTRAINED RELATIVE ENTROPY QUANTIZATION

(75) Inventors: W. Bastiaan Kleijn, Lower Hutt (NZ); Minyue Li, Stockholm (SE)

(73) Assignee: Google Inc., Mountain View, CA (US)

( * ) Notice: Subject to any disclaimer, the term of this patent is extended or adjusted under 35 U.S.C. 154(b) by 44 days.

(21) Appl. No.: 13/497,237

(22) PCT Filed: Sep. 20, 2010

(86) PCT No.: PCT/EP2010/063789

§ 371 (c)(1), (2), (4) Date: Mar. 20, 2012

(87) PCT Pub. No.: WO2011/033103

PCT Pub. Date: Mar. 24, 2011

(65) Prior Publication Data

US 2012/0177110 A1 Jul. 12, 2012

Related U.S. Application Data

(60) Provisional application No. 61/244,683, filed on Sep. 22, 2009.

(30) Foreign Application Priority Data

Sep. 21, 2009 (EP) .................................... 09170881

(51) Int. Cl.
*H04N 7/12* (2006.01)

(52) U.S. Cl.
USPC ..................................................... 375/240.03

(58) Field of Classification Search
USPC ................. 375/240.03, 240.25; 382/190, 233
See application file for complete search history.

(56) References Cited

U.S. PATENT DOCUMENTS

2003/0194132 A1* 10/2003 Kiyuna ......................... 382/190
2006/0215918 A1* 9/2006 Kimura ......................... 382/233

OTHER PUBLICATIONS

Aggarwal et al.: "Efficient bit-rate scalability for weighted squared error optimization in audio coding" IEEE Transactions on Audio, Speech and Language Processing, vol. 14, No. 4, Jul. 2006, pp. 1313-1327.

Casella et al.: "Generalized Accept-Reject sampling schemes" A Festschrift for Herman Rubin Institute of Mathematical Statistics. Lecture notes. vol. 45, 2004, pp. 342-347.

Erne: "Perceptual Audio Coders "What to listen for"", Audio Engineering Society Convention Paper 5489, Presented at the 111th Convention, Sep. 21-24, 2001, New York, New York, pp. 1-10.

(Continued)

*Primary Examiner* — Allen Wong
(74) *Attorney, Agent, or Firm* — Birch, Stewart, Kolasch & Birch, LLP

(57) ABSTRACT

Methods and devices for encoding and decoding are provided. A source signal value is encoded by a quantization index determined using a partition into quantization cells. Decoding of the quantization index takes place by sampling a reconstruction probability distribution, thereby obtaining a reconstructed signal value, such that the reconstructed signal value lies in the same quantization cell as the source signal value. In one embodiment, encoding and decoding are such that their succession preserves the source signal distribution. In another embodiment, the partition and the reconstruction probability distribution are determined in such manner that the quantization error is minimized subject to a constraint on the relative entropy between the source signal and the reconstructed signal.

11 Claims, 3 Drawing Sheets

(56) References Cited

OTHER PUBLICATIONS

International Search Report dated Oct. 29, 2010 for International application No. PCT/EP2010/063789.

Kim et al.: "KLT-Based Adaptive Classified VQ of the Speech Signal", IEEE Transactions on Speech and Audio Processing, vol. 12, No. 3, May 2004, pp. 277-289.

Li et al.: "A low-Delay Audio Coder with Constrained-Entropy Quantization" IEEE Workshop on Applications of Signal Processign to Audio and Acoustics, Oct. 21-24, 2007, pp. 191-194.

Ramprashad: "High Quality Embedded Wideband Speech Coding Using an Inherently Layered Coding Paradigm", http://www.multimedia.bell-labs.com, Downloaded on Sep. 10, 2009 from IEEE Xplore. pp. 1145-1148.

European Office Action issued in EP Application No. 09 170 881.8-2225 on Mar. 2, 2012, 4 pages.

Daudet et al.: "MDCT Analysis of Sinusoids: Exact Results and Applications to Coding Artifacts Reduction", IEEE Transactions on Speech and Audio Processing, vol. 12, No. 3, May 2004, pp. 302-312.

* cited by examiner

CODING AND DECODING OF SOURCE SIGNALS USING CONSTRAINED RELATIVE ENTROPY QUANTIZATION

FIELD OF THE INVENTION

The invention disclosed herein generally relates to devices and methods for processing signals, and particularly to devices and methods for quantizing signals. Typical applications may include a quantization device for audio or video signals or a digital audio encoder.

TECHNICAL BACKGROUND

Quantization is the process of approximating a continuous or quasi-continuous (digital but relatively high-resolving) range of values by a discrete set of values. Simple examples of quantization include rounding of a real number to an integer, bit-depth transition and analogue-to-digital conversion. In the latter case, an analogue signal is expressed in terms of digital reference levels. Integer quantization indices may be used for labelling the reference levels. As used herein, quantization does not necessarily include changing the time resolution of the signal, such as by sampling or downsampling it with respect to time.

Quasi-continuous numbers, such as those at formed at the output of an analogue-to-digital converter, are commonly quantized to enable transmission over a communication network at a relatively low rate. The reconstruction step at the receiving end consists of the decoding of the quantization index to a quasi-continuous representation. This decoded representation may form the input to an digital-to-analogue converter. However, at least if a moderate number of reference levels are applied, perceptible quantization noise and artefacts may occur in the reconstructed signal. In transform-based quantization of audio signals, where the source signal is decomposed into frequency components, the reconstructed signal may exhibit 'birdies', an unpleasant artefact which is perceived somewhat like the sound of running water. In a spectrogram, 'birdies' may have the appearance of islands, that is, weak frequency components surrounded by other components which due to quantization are encoded with zero power intermittently. In a spectrogram, a time-frequency plot of the signal power, the non-zero episodes may occupy isolated areas, reminiscent of islands.

The above problem—and possibly other drawbacks associated with quantization—may be mitigated by increasing the bit rate. However, considering that expected savings in bandwidth and storage is one of the main motivations for quantization, this rather circumvents than solves the problem.

An approach to make quantizers efficient is to optimize the quantizer resolution to minimize the average distortion given a fixed rate or given an average rate. For fixed-rate coders this leads to a variable quantization resolution whereas for variable-rate coders this leads to an asymptotically uniform resolution.

Dithering, that is, adding stochastic noise in connection with the reconstruction of the signal, may improve the audible impression, even though it increases the mean squared error. Indeed, it has been established that some artefacts are associated with an unintended statistical correlation between the quantization error and the source signal value, which all the more perceptible the more the error repeats. The dithering noise however alienates the source signal from the reconstructed signal in terms of probability densities, and there is no theoretical upper bound on the difference.

In addition to these attempts to improve the quantization itself, the field of audio technology offers several techniques for removing the 'birdies' artefact a posteriori: band limitation (see M. Erne, "Perceptual audio coders 'what to listen for'", $111^{th}$ *Convention of the Audio Engineering Society*, September 2001), a regularization method for tonal-like signals (see L. Daudet and M. Sandler, "MDCT analysis of sinusoids: exact results and applications to coding artifacts reduction", *IEEE Transactions on Speech and Audio Processing*, vol. 12, no. 3, May 2004) and noise fill (see S. A. Ramprashad, "High quality embedded wideband speech coding using an inherently layered coding paradigm," in *Proc. IEEE International Conference on Acoustics, Speech, and Signal Processing ICASSP '00*, vol. 2, June 2000).

On the one hand, it is well-known that low-rate video coding results in artifacts such as blurriness, ringing, and blocking. On the other hand, a high-perceived quality texture of video objects can be created by means of statistical parametric models (see, e.g., J. Portilla and E. P. Simoncelli, "A parametric texture model based on joint statistics of complex wavelet coefficients", *International Journal of Computer Vision*, vol. 40, no. 1, pp. 49-71, 2000). However, high-quality parametric models do not provide an exact description of the original image and no certainty exists about their perceived accuracy.

SUMMARY OF THE INVENTION

It is with respect to the above considerations and others that the present invention has been made. The present invention seeks to mitigate, alleviate or eliminate one or more of the above-mentioned deficiencies and drawbacks singly or in combination. In particular, it would be desirable to provide a method and device for quantizing a signal with limited quantization noise. In this respect, quantization is understood as a system of encoding and decoding. Further, it would be desirable to provide such method and device that unite advantages of available coders. It would also be desirable to provide a quantization method and quantization device that introduce a limited amount of perceptible artefacts when applied to audio coding at moderate bit rates.

To better address one or more of these concerns, quantization methods and devices as defined in the independent claims are provided. Embodiments of the invention are defined in the dependent claims.

According to a first aspect of the invention, encoding a source signal, which consists of a sequence of source signal values, comprises:

- receiving an estimated probability distribution of the source signal;
- determining, in part, a partition into quantization cells by minimizing the quantization error subject to a constraint on a measure of the difference between the estimated probability distribution of the source signal and the reconstruction distribution; and
- assigning to each source signal value a quantization index referring to one cell, which contains the source signal value, in said partition into quantization cells.

According to a second aspect of the invention, decoding a source signal thus encoded comprises:

- generating, for each quantization index, a reconstructed signal value by sampling a reconstruction probability distribution, wherein said reconstructed signal value lies in the quantization cell indicated by the quantization index.

The encoding may consist of a comparison of the source signal value and a sequence of quantization cell limits, whereby an index of the quantization cell containing the source signal value is obtained. In the decoding, the reconstruction probability distribution depends on the quantization index but the reconstructed signal values are sampled in a statistically independent fashion, memorylessly. Artefacts that are known to originate from correlation of quantization errors are thus prevented. It is emphasized that the reconstruction probability distribution is not a point mass (delta function)—in which case sampling would not be a stochastic process—but has support of positive measure. In typical embodiments of the invention, the reconstruction probability distribution depends on the source signal distribution.

As used herein, a signal may be a function of time or a time series that is received in real time or retrieved from a storage or communication entity, e.g., a file or bit stream containing previously recorded data to be processed. Further, the method may be applied to a transform of a signal, such as timevariable components corresponding to frequency components.

The encoding and decoding may be performed by entities that are separated in time or space. For instance, encoding may be carried out in a transmitter unit and decoding in a receiving unit, which is connected to the transmitter unit by a digital communications network. Further, encoded analogue data may be stored in quantized form in a volatile or non-volatile memory; decoding may then take place when the quantized data have been loaded from the memory and the encoded data are to be reconstructed in analogue form. Moreover, quantized data may be stored together with the quantization parameters (e.g., parameters defining the partition into quantization cells or parameters used for characterizing the reconstruction probability distribution) in a data file format that can be transmitted between devices; thus, if such a data file has been transmitted to a different device than the encoding device, the quantization parameters may be used for carrying out decoding of the quantized data.

In further aspects of the present invention, there are provided devices and computer-program products for encoding and decoding. A device for encoding and decoding are referred to as an encoder and decoder, respectively.

Generally speaking, the encoders or decoders operate similarly to the respective methods and share their advantages. Likewise, features included in particular embodiments of a quantization method, which are to be disclosed hereinafter, can be carried over by one skilled in the art, possibly with the aid of routine experimentation, to embodiments of quantization device and vice versa.

One embodiment of the invention includes using an estimated probability distribution of the source signal and using a reconstruction probability distribution corresponding to this distribution. In particular, the reconstruction probability distribution may be an approximation of the estimated probability distribution of the source signal. To illustrate this in the case of the ith quantization cell, the reconstructed signal value is a random sample from a stochastic variable, whose probability distribution approximates the estimated probability distribution of the source signal conditioned on the source signal value falling in the ith cell. In practice, this can be achieved by sampling from a distribution that vanishes outside the ith quantization cell. Quantization according to this embodiment is adapted to preserve the distribution of the source signal. In addition to preserving the distribution of the source signal, variants of this embodiment may further provide quantization that is optimal as far as the mean squared quantization error is concerned.

In a variant to this embodiment, the reconstruction probability distribution is determined on the basis of an estimated source signal probability distribution, but is not identical to this. For example, the estimated source signal probability distribution may be modified so as to emphasize the expected value within each cell before it is used as reconstruction probability distribution.

In yet another embodiment of the invention, the partition into quantization cells and/or the reconstruction probability distribution are determined in such manner that the quantization error is minimized subject to a constraint on the relative entropy (also known as Kullback-Leibler divergence) from the estimated probability distribution of the source signal to the reconstruction distribution. In other words, a constrained optimization problem is solved before the first execution of the quantization process for a particular source probability distribution. In contrast to this embodiment, conventional quantizers minimize the quantization error unconditionally.

In still another embodiment, the partition into quantization cells and/or the reconstruction probability distribution are determined in such manner that the quantization error is minimized subject to a bit-rate condition and constraint on the relative entropy between the estimated probability distribution of the source signal and the reconstruction distribution. More precisely, the bitrate condition is an upper bound on the theoretical minimum bit rate required for transmission or storage. As will be further elaborated on below, this embodiment has produced excellent empirical results.

In yet another embodiment, the partition into quantization cells and/or the reconstruction probability distribution are determined in such manner that the bit rate is minimized subject to a condition on distortion and a and constraint on the relative entropy between the estimated probability distribution of the source signal and the reconstruction distribution.

In a simplified embodiment, the partition into quantization cells and/or the reconstruction probability distribution are determined in such manner that the quantization error is minimized subject to a bit rate condition and the condition that the reconstruction distribution is identical to the estimated probability distribution of the source signal.

In one embodiment, the partition into quantization cells and the reconstruction probability distribution may be determined in such manner that a measure of the difference between the source signal probability distribution and the reconstruction probability distribution is reduced, or preferably minimized. In particular, the partition and the reconstruction probability distribution may be determined by running a minimization process relating to the relative entropy between the estimated probability distribution of the source signal and the reconstruction distribution. The process may be run to (approximate) minimality or may be interrupted prematurely when a partition and reconstruction probability distribution have been obtained that are associated with a relative entropy that is adequately low in the circumstances. Advantageously, each of these minimization processes are performed subject to a bit-rate condition, which may be an upper bound on the theoretical minimum bit rate required for transmission or storage.

Any of the above embodiments can be generalized into a multidimensional quantization process, wherein the source signal, the quantization index and the reconstructed signal are vector-valued. In the context of audio coding, each vector component may encode one audio channel. Quantization in parallel channels may be effected in an iterative fashion, not necessitating exchange of information between channels.

Encoding according to the invention can be combined with conventional decoding. Similarly, any of the decoding embodiments of the invention can be combined with a conventional encoding process. Possibly, such conventional encoding can be supplemented by an estimation of the probability distribution of the source signal in order to provide the necessary information to the decoding process.

BRIEF DESCRIPTION OF THE DRAWINGS

Embodiments of the present invention will now be disclosed in more detail with reference to the accompanying drawings, on which.

DETAILED DESCRIPTION OF EMBODIMENTS

I. Quantizer

In the following description of methods and apparatus according to the invention, the source signal, the quantization index and the reconstructed signal will be treated as random variables X, I and $\hat{X}$. Realizations of X and $\hat{X}$ take values in real space, whereas realizations of I take values in a countable set, such as the natural numbers. The mapping from X to I is a space partition and that from I to $\hat{X}$ is a reconstruction procedure. The conventional goal of quantizer design is to minimize a distortion measure (quantization error) between the source signal and the quantized signal subject to a bit rate budget.

The probability mass function $p_{I|X}(i|x)$ and the probability density function $f_{\hat{X}|I}(x|i)$ can be used, respectively, to define the encoding and decoding aspects of the quantization process. Conditioned on the index I, variables X and $\hat{X}$ are independent. Conventional quantization uses a fixed partition and fixed reconstruction points. This implies that $f_{\hat{X}|I}(x|i)$ takes the form of a set of Dirac delta functions and $p_{I|X}(i|x)$ assumes a value of either 0 or 1. For conventional dithered quantization, the partition and, therefore, the mapping changes for each quantizer operation.

Figure 1:
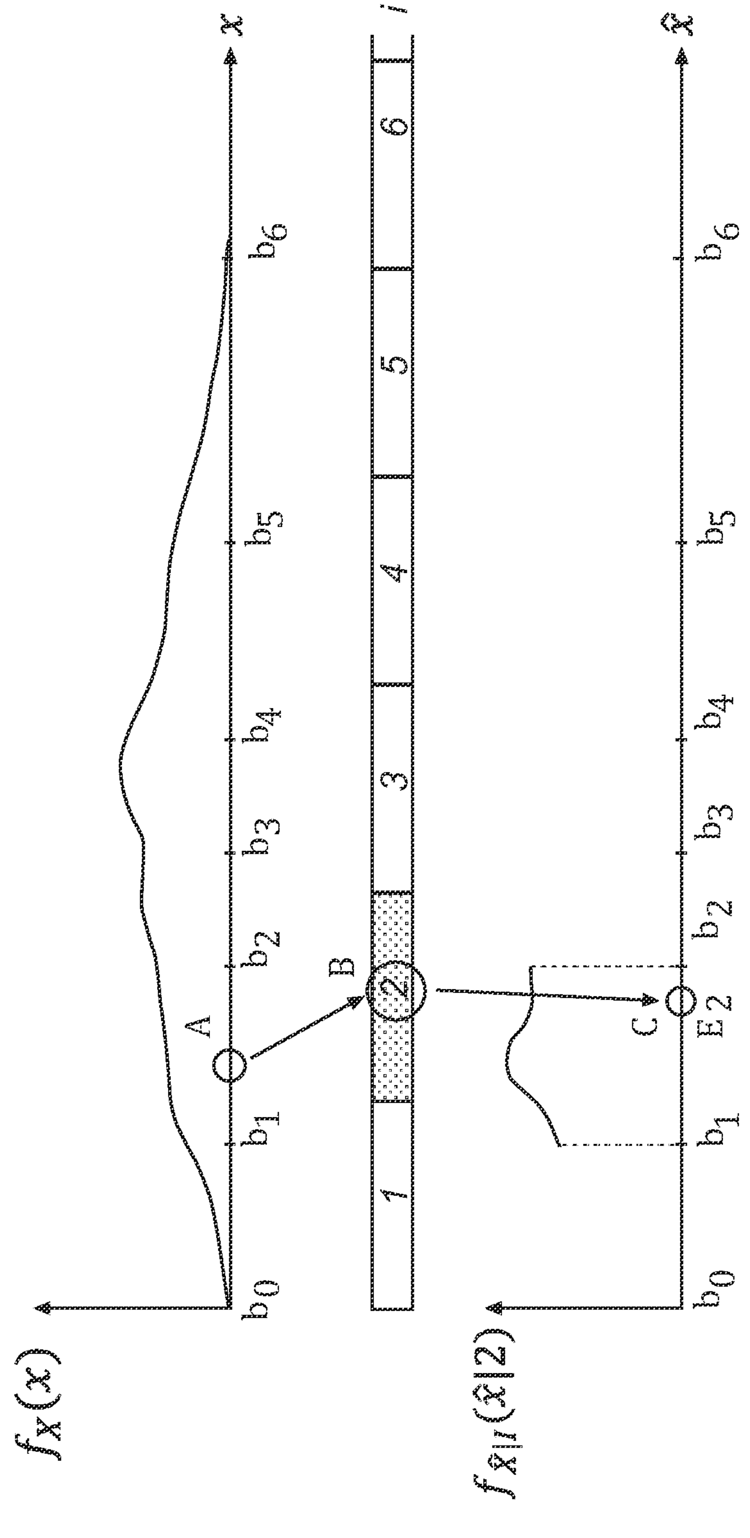
FIG. 1 is an illustration of quantization according to an embodiment of the invention.

FIG. 1 illustrates quantization according to a first embodiment of the invention in a one-dimensional exemplary case. The probability density $f_X$ of the source signal X is drawn at the top of the figure. In this embodiment, knowledge of $f_X$ is not necessary. Further indicated are six quantization cells, delimited by numbers $b_0$, $b_1$, $b_2$, $b_3$, $b_4$, $b_5$ and $b_6$. The sixth cell is unbounded above. An exemplary source signal value is indicated by a circle labelled A. The value falls in the second quantization cell, and will therefore be encoded by a quantization index i=2, as indicated by a circle labelled B. In a decoding step, which may take place after digital transmission or digital storage of the quantization index, a reconstructed signal value is generated in the form of a random number sampled from a reconstruction distribution $f_{\hat{X}|I}(x|2)$ conditioned on i=2. The reconstructed signal value, which is indicated by a circle labelled C, is not deterministic, and thus two occurrences of the same quantization index are generally reconstructed as distinct values. However, because the reconstruction distribution $f_{\hat{X}|I}(x|2)$ vanishes outside the second quantization cell, the random number necessarily falls in the second quantization cell.

It is noted that the quantization cell boundary can be included or excluded from the cell. This has no significant difference on the outcome.

A variety of reconstruction probability distributions may be applied. As an example, one may use a reconstruction probability distribution that is similar to that of the source signal but emphasizes the expected value in the cell. To illustrate, a reconstruction probability distribution with these characteristics has been traced in the bottom portion of FIG. 1. Additionally, the expected value $E_2$ of X in the second cell, as defined in equation (4), has been indicated next to the circle C.

II. Constrained-Relative-Entropy (CRE) Quantizer

As the skilled person knows, distortion may be measured in different senses which reflect the perception in a given situation of the human ear to a greater or smaller extent. Possible choices of distortion measures include the family of $l^p$ norms. This section will be concerned with the special case of a distortion measure which can be written as an inner product is used:

$$d(x,\hat{x})=\langle x-\hat{x},x-\hat{x}\rangle. \tag{2}$$

This quantifies the distortion in the sense of mean squared error ($l^2$). The expectation of the distortion measure conditioned on the index is:

$$\begin{aligned} D_i &= \int_{\mathbb{R}}\int_{\mathbb{R}} d(x,\hat{x}) f_{X,\hat{X}|I}(x,\hat{x}\mid i)\,dx\,d\hat{x} \\ &= \int_{\mathbb{R}}\int_{\mathbb{R}} \left\langle \begin{matrix} x-E_i-(\hat{x}-E_i), \\ x-E_i-(\hat{x}-E_i) \end{matrix} \right\rangle f_{X|I}(x\mid i) f_{\hat{X}|I}(\hat{x}\mid i)\,dx\,d\hat{x} \\ &= \int_{\mathbb{R}} d(x,E_i) f_{X|I}(x\mid i)\,dx + \int_{\mathbb{R}} d(x,E_i) f_{\hat{X}|I}(x\mid i)\,dx - \\ &\quad 2\int_{\mathbb{R}}\int_{\mathbb{R}} \langle x-E_i,\hat{x}-E_i\rangle f_{X|I}(x\mid i) f_{\hat{X}|I}(\hat{x}\mid i)\,dx\,d\hat{x} \\ &= \int_{\mathbb{R}} d(x,E_i)\big(f_{X|I}(x\mid i)dx + f_{\hat{X}|I}(x\mid i)\big)\,dx. \end{aligned} \tag{3}$$

where $E_i$ denotes the conditional mean of X, namely $$E_i=\int_{\mathbb{R}} x f_{X|I}(x|i)\,dx. \tag{4}$$

The overall distortion is the mean of the conditional distortions, that is, $$D=\sum_i p_I(i) D_i. \tag{5}$$

The minimum rate required can be written as the mutual information from X to $\hat{X}$. In typical quantization systems, the mapping from I to $\hat{X}$ does not lose information, meaning that the mutual information between X and I is the same as that between X and $\hat{X}$. In this case, the minimum rate is $$R=\sum_i \int_{-\infty}^{\infty} p_{I|X}(i\mid x) f_X(x) \log\frac{p_{I|X}(i\mid x)}{p_I(i)}\,dx.$$

As a preliminary, consider a quantization that preserves the distribution of the source. Applying the principles of conventional quantization, one may simply force $f_{\hat{X}|I}(x|i)$ to be the same as $f_{X|I}(x|i)$ to achieve this. If $$f_{\hat{X}|I}(x|i)=f_{X|I}(x|i),$$

then $$D_i=2\int_{\mathbb{R}} d(x,E_i) f_{X|I}(x|i)\,dx \tag{7}$$

The distortion in this case is two times of that in many conventional quantizers. The rate, which only depends on the first mapping, does not change with the introduction of this new quantizer. Thus, to have the new feature of distribution preservation, the space partition does not require any changes to remain optimal; only the reconstruction procedure (decoding) needs modification.

To relax the condition of making the probability density of the quantized variable identical to that of the source, a measure of the difference between probability densities is needed. Inter alia, relative entropy can be used for this purpose. The relative entropy between the source signal and the reconstructed signal is $$\begin{aligned} K &= \int_R f_X(x)\log\left\{\frac{f_X(x)}{f_{\hat{X}}(x)}\right\}dx \\ &= \sum_i p_I(i)\int_R f_{X|I}(x\mid i)\log\frac{\sum_j p_I(j)f_{X|I}(x\mid j)}{\sum_j p_I(j)f_{\hat{X}|I}(x\mid j)}dx \\ &\approx \sum_i p_I(i)\int_R f_{X|I}(x\mid i)\log\frac{f_{X|I}(x\mid i)}{f_{\hat{X}|I}(x\mid i)}dx \\ &= \sum_i p_I(i)K_i \end{aligned}$$

where $K_i$ denotes the relative entropy of X and $\hat{X}$ conditioned on I=i. This means that the relative entropy can be approximated by the averaged conditional relative entropy. The approximation is reasonable because within the support of $f_{X|I}(x|i)$, $p_I(i)f_{X|I}(x|i)$ should dominate in the summation $\Sigma_j p_I(j)f_{X|I}(x|j)$, and $p_I(i)f_{\hat{X}|I}(x|i)$ dominates in the summation $\Sigma_j p_I(j)f_{\hat{X}|I}(x|j)$.

There will now be derived the reconstruction distribution $f_{\hat{X}|I}(x|i)$ and the space partition $p_{I|X}(i|x)$ that minimize the distortion under constraints on the averaged relative entropy $\overline{K}$ and the bit rate R. The problem can be formulated as a constrained minimization of mean squared quantization error:

$$\begin{aligned} &\min_{p_{I|X}(i|x),\,f_{\hat{X}|I}(x|i)} D = \sum_i p_I(i)D_i \\ &\text{s.t. } \overline{K} = \sum_i p_I(i)K_i < T \\ &R < N \\ &\int_{\mathbb{R}} f_{\hat{X}|I}(x\mid i)\,dx = 1. \end{aligned} \tag{9}$$

where R is a function depending only on $f_{X|I}(x|i)$. When T is set to zero, the solution to (9) corresponds to the quantization with invariant probability distribution. When T is set arbitrarily large, the solution to (9) reduces to a conventional rate-distortion optimized quantization. With other choices of T, the optimal quantization stays between the two extremes.

The optimization can be performed in two stages: a first stage for finding the optimal reconstruction distribution $f_{\hat{X}|I}(x|i)$ for all indices and any constraint on $K_i$, and a second stage for finding the best partition $p_{I|X}(i|x)$. The first stage of the optimization (9) can be written as $$\begin{aligned} &\min_{f_{\hat{X}|I}(x|i)} D_i \\ &\text{s.t. } K_i < T_i \\ &\int_{\mathbb{R}} f_{\hat{X}|I}(x\mid i)\,dx = 1. \end{aligned} \tag{10}$$

The following Lagrangian is formed:

$$J = \int_{\mathbb{R}} d(x, E_i)f_{\hat{X}|I}(x\mid i) + \lambda f_{X|I}(x\mid i)\log f_{\hat{X}|I}(x\mid i) + \mu f_{\hat{X}|I}(x, i)dx. \tag{11}$$

and the corresponding Euler-Lagrange equation is $$d(x, E_i) + \lambda\frac{f_{X|I}(x\mid i)}{f_{\hat{X}|I}(x\mid i)} + \mu = 0. \tag{12}$$

Thus, the optimal reconstruction probability density has the following form:

$$f^*_{\hat{X}|I}(x\mid i) \propto \frac{f_{X|I}(x\mid i)}{\theta_i d(x, E_i) + 1}. \tag{13}$$

If $\theta_i=0$, then $$f_{\hat{X}|I}(x|i)=f_{X|I}(x|i),$$

which is the distribution-preserving case. On the other hand, if $\theta_i\to\infty$, one obtains $$f_{\hat{X}|I}{}^*(x|i)\to\delta(x-E_i), \tag{15}$$

which corresponds to a classical quantizer.

Using the optimal reconstruction probability density, the distortion measure and the relative entropy are as follows:

$$D_i^* = \int_{\mathbb{R}} f_{X|I}(x\mid i)\left(d(x, E_i) + \frac{c_i d(x, E_i)}{\theta_i d(x, E_i) + 1}\right)dx, \tag{16}$$

and $$K_i^* = -\log c_i + \int_{\mathbb{R}} f_{X|I}(x|i)\log(\theta_i d(x,E_i)+1)dx, \tag{17}$$

where $c_i$ is the normalization factor $$c_i = \left(\int_{\mathbb{R}} \frac{f_{X|I}(x\mid i)}{\theta_i d(x, E_i) + 1}dx\right)^{-1}. \tag{18}$$

The second stage of the optimization (9) can be written as $$\begin{aligned} &\min_{p_{I|X}(i|x),\,\theta_i} D = \sum_i p_I(i)D_i^* \\ &\text{s.t. } \overline{K} = \sum_i p_I(i)K_i^* < T \\ &R < N. \end{aligned} \tag{19}$$

The optimal partition is related to the explicit form of the distortion measure and the bit rate, and the assumption (2) will be maintained in the following derivation. For the sake of clarity, the calculations are made for a one-dimensional source signal X, but are easily generalizable to vector-valued signals. For one-dimensional X, the partition is given by $$p_{I|X}(i\mid x)=\begin{cases}1 & b_{i-1}<x<b_i\\ 0 & \text{otherwise,}\end{cases} \tag{21}$$

where $b_0$, $b_1$, $b_2$, . . . for a sequence of cell boundaries. The step size is defined as the size of a cell, that is, $\Delta_i=b_i-b_{i-1}$. The bit rate (6) can be written as $$R=-\sum_i p_I(i)\log p_I(i). \tag{23}$$

High rate is assumed, so that $f_{X|I}(x|i)$ is approximately flat (varies slowly) in each cell. Under the optimal reconstruction distribution (13), the normalization factor (18), the conditional distortion (16) and the conditional relative entropy (17) become as follows:

$$\begin{aligned}c_i &\approx \left(\int_{-\Delta_i/2}^{\Delta_i/2}\frac{1}{\Delta_i(\theta_i x^2+1)}dx\right)^{-1}\\ &=\frac{\Delta_i\sqrt{\theta_i}}{2\arctan(\Delta_i\sqrt{\theta_i}/2)},\end{aligned} \tag{24}$$

and $$\begin{aligned}D_i^* &\approx \int_{-\Delta_i/2}^{\Delta_i/2}\frac{x^2}{\Delta_i}dx + c_i\int_{-\Delta_i/2}^{\Delta_i/2}\frac{x^2}{\Delta_i(\theta_i x^2+1)}dx\\ &=\frac{\Delta_i^2}{12}+\frac{1}{\theta_i}\left(\frac{\Delta_i\sqrt{\theta_i}}{2\arctan(\Delta_i\sqrt{\theta_i}/2)}-1\right),\end{aligned} \tag{25}$$

and $$\begin{aligned}K_i^* &\approx -\log c_i + \int_{-\Delta_i/2}^{\Delta_i/2}\frac{1}{\Delta_i}\log(\theta_i x^2+1)dx\\ &=-\log\frac{\Delta_i\sqrt{\theta_i}}{2\arctan(\Delta_i\sqrt{\theta_i}/2)}+\log(\Delta_i^2\theta_i/4+1)+\\ &\quad\frac{4\arctan(\Delta_i\sqrt{\theta_i}/2)}{\Delta_i\sqrt{\theta_i}}-2.\end{aligned} \tag{26}$$

It immediately follows that $$\lim_{\theta\to\infty} D_i^*=\frac{\Delta_i^2}{12},$$

which is consistent with the classical theory. Moreover, $$\lim_{\theta\to 0} D_i^*=\frac{\Delta_i^2}{6}.$$

Thus, to preserve the probability distribution after quantization, the signal-to-noise ratio (SNR) needs to be reduced by 3 dB, as seen in equation (7) above.

In order to solve the optimization (19), the Lagrangian below is formed, to which a high-rate approximation is applied:

$$\begin{aligned}J &= \sum_i p_I(i)(D_i^*+\lambda K_i^*+\mu\log p_I(i))\\ &\approx \sum_i f_X(x_i)\Delta_i(D_i^*+\lambda K_i^*+\mu\log(f_X(x_i)\Delta_i))\\ &\approx \int_{\mathbb{R}} f_X(x)(D^*(x)+\lambda K^*(x)+\mu\log\Delta(x))dx-\mu h(X),\end{aligned} \tag{27}$$

where $b_{i-1}<x_i<b_i$ and $h(X)=-\int_{-\infty}^{\infty} f_X(x)\log f_X(x)dx$. Further, $D^*(x)$, $K^*(x)$ are $D_i^*$, $K_i^*$ made continuous with respect to i, and consequently $\theta_i$, $\Delta_i$ in (25), (26) are replaced by $\theta(x)$, $\Delta(x)$, respectively. However, it can be shown that optimality requires that both $\theta(x)$ and $\Delta(x)$ be constant in each quantization cell.

Figure 2:
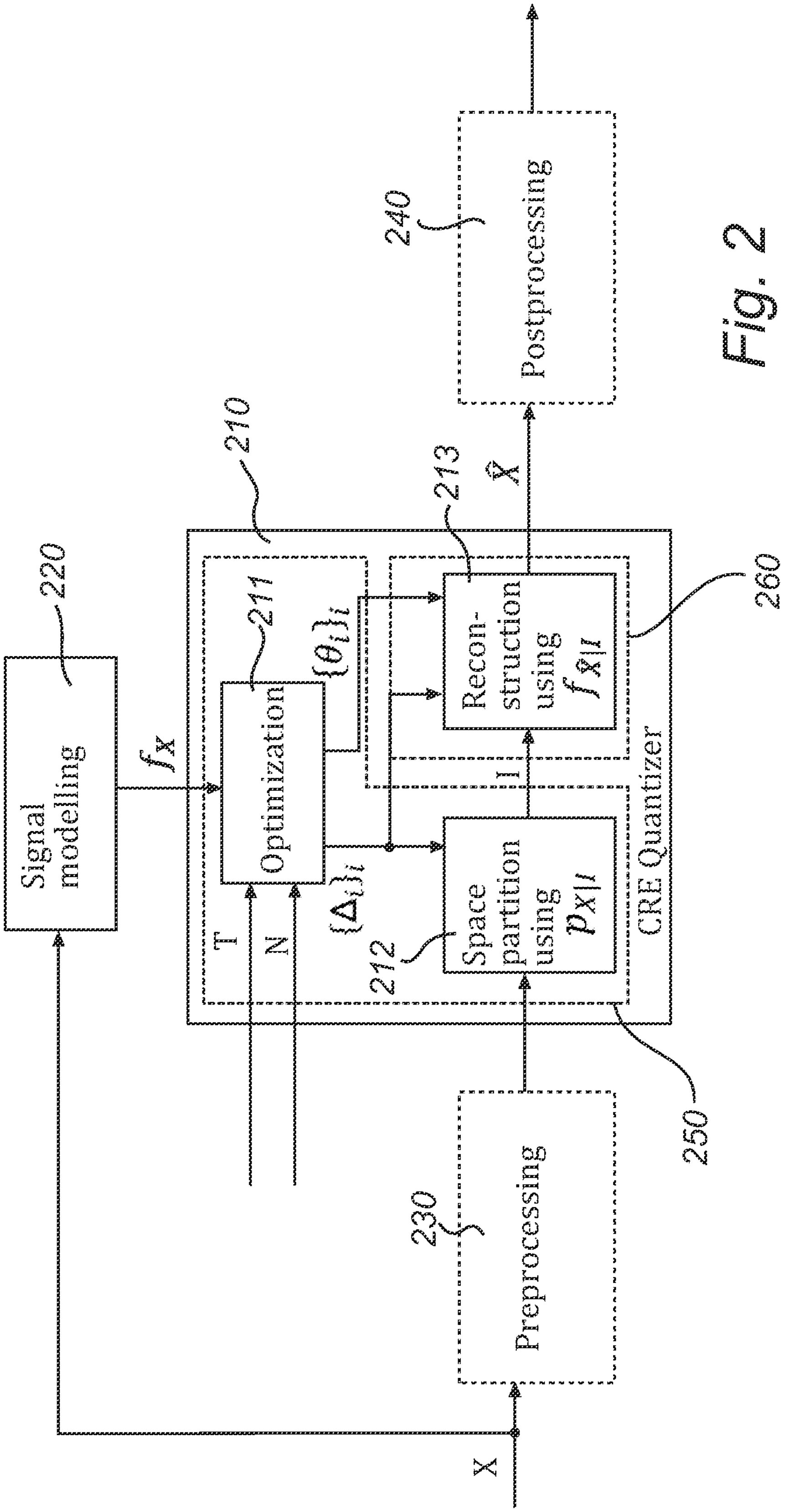
FIG. 2 is a block diagram of a quantizer according to an embodiment of the invention.

FIG. 2 shows a CRE quantizer 210 according to a second advantageous embodiment of the invention. FIG. 2 further shows several auxiliary components: a signal modelling section 220 for estimating the probability density $f_X$ of the source signal X and providing this to the CRE quantizer 210; optional pre-processing sections, which are shown as one block 230 and may include means for weighting and normalization; and optional post-processing sections, shown as a single block 240 and possibly including inverse weighting, amplification etc. The CRE quantizer comprises an encoder 212 and a decoder 213. The output of the encoder 212 is a sequence of quantization indices I, which can be conveniently transmitted and/or stored in digital form. Decoding of the quantization index I is the responsibility of the decoder 213, which outputs a reconstructed signal $\hat{X}$.

The CRE quantizer 210 further includes a solver 211 for solving the constrained optimization problem (19). The solver 211 is adapted to receive the estimated probability density $f_X$ of the source signal from the signal modelling section 220 as well as bounds T, N on the relative entropy and the bit rate. As seen above, the outputs of the optimization (19) are the constants $b_0, b_1, \ldots, b_M$ and $\theta_1, \theta_2, \ldots, \theta_M$, where M is the number of quantization cells. The solver 211 provides these outputs to the encoder 212 and the decoder 213. The encoder 212 compiles the space partition $p_{I|X}(i|x)$ according to equation (19) using $b_0, b_1, \ldots, b_M$. The decoder 213 compiles the reconstruction density $f_{\hat{X}|I}(x|i)$ according to equation (13) using $\theta_1, \theta_2, \ldots, \theta_M$ and followed by a normalization in which $b_0, b_1, \ldots, b_M$ are needed.

As an alternative, the decoder 213 is adapted to use the high-rate assumption, by which $$f_{X|I}(x\mid i)=\begin{cases}\Delta_i^{-1} & b_{i-1}<x<b_i\\ 0 & \text{otherwise.}\end{cases}$$

Hence, by (13), $$f_{\hat{X}|I}(x\mid i)=\begin{cases}\dfrac{c_i}{\Delta_i(\theta_i d(x,E_i)+1)} & b_{i-1}<x<b_i\\ 0 & \text{otherwise}\end{cases} \tag{28}$$

with $d(x,E_i)=(x-E_i)^2$.

The decoder 213 is adapted to follow a procedure for sampling the reconstruction probability distribution, that is, to generate realizations of a random variable having this probability distribution. As the skilled person knows, this can be accomplished by applying a Monte-Carlo-theory method, by which the inverse cumulative distribution is used for mapping random numbers having a uniform distribution U(a,b) to random numbers having some particular desired distribution. From equation (28) it follows that the conditional cumulative distribution function is $$F_{\hat{X}|I}(x|i) \propto \arctan\sqrt{\theta_i}(x-E_i)$$

and hence, $$F_{\hat{X}|I}^{-1}(x|i) \propto \tan\sqrt{\theta_i}(x-E_i).$$

An advantageous way of implementing the reconstruction procedure is the accept-reject method, which may be implemented as follows:

1. Compute $C=\sup_x f_{X|I}(x|i)$.
2. If $\theta=0$, generate $Y \in U(b_{i-1},b_i)$ then go to 5.
3. Generate $S \in U(l,r)$, where $l=\arctan(\sqrt{\theta_i}(b_{i-1}-E_i))$ and $r=\arctan(\sqrt{\theta_i}(b_i<E_i))$, so that Y below lies in the ith quantization cell.
4. Calculate $$Y = \frac{\tan S}{\sqrt{\theta_i}} + E_i.$$

5. Generate $U \in U(0,1)$.
6. If $$\frac{f_{X|I}(Y, i)}{C} > U,$$

stop and output Y; otherwise go back to 2.

The above scheme is generic. Applying the high-rate approximation will imply that $C=\Delta_i^{-1}$.

Sub-portions of the quantizer 210 may operate independently. For instance, an encoder device 250 may consist of the solver 211 and the encoder 212. The encoder device 250 would have the source signal X and its estimated probability distribution $f_X$ as inputs, and the quantization indices I as output.

Likewise, a decoder device 260 may comprise the decoder 213 and be adapted to receive quantization indices I and the constants $\{\Delta_i\}_i$, $\{\theta_i\}_i$, and to generate the reconstructed signal $\hat{X}$.

As an alternative to this embodiment, the decoder device 260 receives the sequence of quantization indices I as its only input, and uses a fixed reconstruction probability distribution. For instance, the quantization may refer to a fixed partition into cells, and a uniform distribution in each cell may used as reconstruction probability distribution. Still sampling is carried out by means of independent random number generation, so that correlated quantization errors are avoided.

In another alternative embodiment, the decoder device 260 has a second receiving section (not shown) for receiving an estimated probability distribution of the source signal. This estimated probability distribution is used as reconstruction probability distribution. Optionally, the decoder device 260 includes a means for determining the reconstruction probability distribution on the basis of the received estimated probability distribution of the source signal, e.g., by emphasizing the expected value in each cell. This means may be a data processor, possibly with storage capacity.

III. Audio Coder

CRE quantization facilitates audio coding with good quality for a large range of bit rates. It has already been shown that by adjusting $\theta$ in the reconstruction probability distribution, it is possible to control the quantizer to be mean-squared-error minimized, to preserve the distribution, or to have intermediate properties. An audio coder that uses the CRE quantization can behave as a coder that optimizes a perceptually weighted SNR-optimized coder, a coder with noise fill or bandwidth extension, and a vocoder (which is adapted to reconstruct the source signal in such manner that the probability distribution is preserved). These paradigms represent the best coding systems at different bit rates.

In a third embodiment of the invention, CRE quantization is applied to a scalable audio coder. This coder can operate at any bit rate above 8 kbps and provides a performance comparable to the best available coders over a range of bit rates. It is based on the same signal model and the same coding technology regardless of the choice of bit rates. The audio coder adopts the principles from M. Y. Kim and W. B. Kleijn, "KLT-based adaptive classified VQ of the speech signal," *IEEE Transactions on Speech and Audio Processing*, vol. 12, no. 3 (May 2004) and M. Li and W. B. Kleijn, "A low-delay audio coder with constrained-entropy quantization," in *Proc. IEEE Workshop on Applications of Signal Processing to Audio and Acoustics* (October 2007), both of which are included herein by reference in their entirety.

Figure 3:
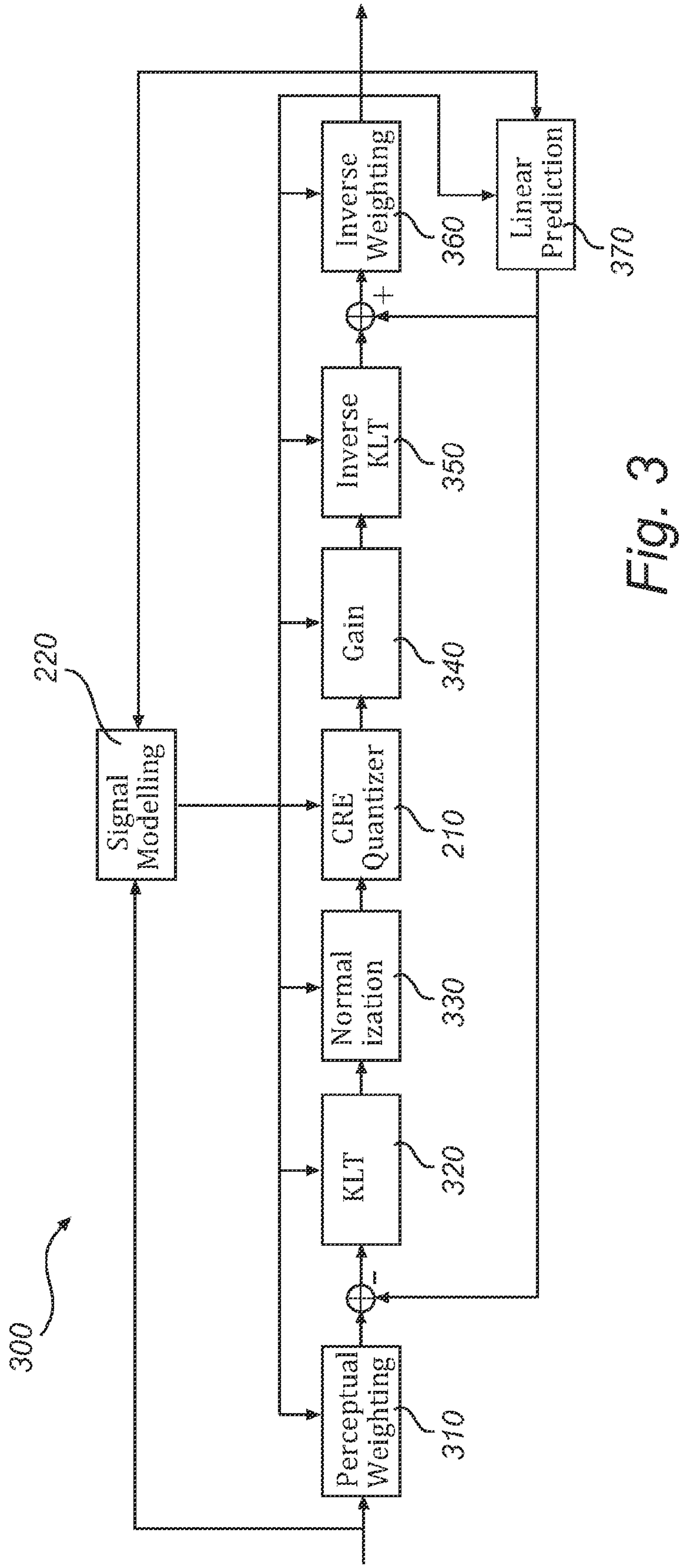
FIG. 3 is a block diagram of an audio coder including the quantizer shown in FIG. 2.

FIG. 3 is a block diagram of an audio coder 300 in accordance with this embodiment of the invention. The audio coder includes the CRE quantizer 210 and the signal modelling section 220 which were shown in FIG. 2. Further included are: a perceptual weighting section 310, a Karhunen-Loève transformer 320, a normalization section 330, an amplifier 340, an inverse Karhunen-Loève transformer 350, an inverse weighting section 360 and a linear predictor 370. These entities may be implemented as one or more hardware modules including dedicated or programmable components. Alternatively, they may be carried one by or more programmable data processing units.

The signal is modeled as an autoregressive (AR) process. Specifically, it is supposed to be generated by filtering a white Gaussian noise (WGN) with a concatenate of a pitch filter and a spectral envelope shaping filter, which are both all-pole and time variant. The model can be written in the z-domain as $$S(z) = \sigma\frac{1}{1+A(z)}\frac{1}{1+B(z)}W(z),$$

where S(z) and W(z) are the z-transforms of the signal and the WGN process, respectively. The signal model which is defined by linear prediction coefficients (LPC) that describe A(z), pitch parameters that define B(z) and gain $\sigma$ can be obtained by a variety of existing technologies. Most of the other components of the coder are adapted on the basis of the signal model.

The perceptual weighting draws on the well studied spectral masking of noise. Given the spectrum of the signal, which is estimated by the signal model, a spectral masking curve can be derived. It tells the audibility of noise power in different frequencies. The overall audibility of noise is the masking curve weighted integral of the noise's spectrum. To minimize the overall noise audibility, one may weight the signal with the inverse masking curve and minimize the noise power in the weighted signal. Then the design of the remaining components of the audio coder can be aimed at minimizing the MSE. Assuming stationarity of the signal, the perceptual weighting can be achieved by filtering.

The signal is processed block-wise. Zero-input response (ZIR) corresponds to a linear prediction of the current block based on preceding blocks. The subtraction of ZIR removes inter-frame dependency. Two types of ZIR calculation can be used, open-loop or closed-loop. Closed-loop ZIR calculation is preferable since it may lead to smaller MSE. However, it requires a reconstruction of the signal at the encoder, which is described later.

According to the signal model, the residual block after ZIR subtraction is a multivariate Gaussian random variable. The mean is a zero vector and the covariance matrix can be obtained from the model. The remaining redundancy is removed by the Karhunen-Loève transform (KLT). According to the signal model, the KLT coefficients have Gaussian distribution. The KLT matrix and the standard deviations of the KLT coefficients are obtained by performing a singular value decomposition on the impulse matrix of the AR filter. Normalization may be effected, in order to achieve a relatively constant bit rate, before CRE quantization is applied to the KLT coefficients. Closed-loop ZIR calculation requires the existence of a reconstructed signal at the encoder. The reconstruction mechanism includes an amplifier that inverses the normalization, an inverse KL, a ZIR adding, and an inverse weighting.

It is noted that the audio coder 300 may act as an encoder on the transmitter side of a digital communication link. The decoding section, which evidently has a counterpart on the receiver side, is needed because a closed-loop prediction is used. In this application, the quantization index I is both an intermediate signal inside the audio coder and its effective output signal. The decoder incorporates a replication of the decoding section and the linear prediction (ZIR calculation). As outlined in an earlier section if this disclosure, it may also use additional information from the encoder to obtain the signal model and the quantized KLT coefficients.

The audio coder 300 shown in FIG. 3 was evaluated by experiments conducted at 14 kbps with a sampling frequency of 16 kHz and in the distribution-preserving regime $\theta=0$. As a comparison, similar tests were carried out using this configuration both with the CRE quantizer 210 and with this unit replaced by two different conventional quantizers, namely a constrained-entropy quantizer and a constrained-resolution quantizer. The distribution preservation was applied to the high frequency (above 3000 Hz) part of the signal only.

Spectrogram measurements showed that the coder exhibits the 'birdies' artefact at low bit rates for the two conventional alternatives, constrained entropy and constrained resolution quantization. The proposed audio coder according to the invention is not affected by this problem when tuned to be in favour of preserving the probability distribution of the source.

Further, an A/B listening test was conducted using twelve sequences from the standard MPEG test set that includes speech and music of different types. Twelve listeners participated in the test and gave consistent results. Table 1 below shows the percentage of the votes favoring the CRE quantizer for each item.

TABLE 1

| Percentage of votes for CRE quantizer | | |
|---|---|---|
| Item | Content | votes for CRE |
| es01 | English female speaker | 100% |
| es02 | German male speaker | 100% |
| es03 | English female speaker | 100% |
| sc01 | Trumpet solo and orchestra | 100% |
| sc02 | Symphonic orchestra | 92.7% |
| sc03 | Contemporary pop music | 100% |
| si01 | Harpsichord | 100% |
| si02 | Castanets | 100% |
| si03 | Pitch pipe | 100% |
| sm01 | Bagpipes | 75% |
| sm02 | Glockenspiel | 50% |
| sm03 | Plucked strings | 100% |

These results show that quantization according to the invention enables an inherently scalable audio coding system that provides excellent perceived quality.

IV. Video Coder

When applied to video coding, the proposed quantization method provides a high-rate quality and accuracy that is similar to that of conventional high-rate encoding, while smoothly transitioning to a high-quality parametric model at lower rates, thereby avoiding artifacts.

V. Closing Remarks

While the invention has been illustrated and described in detail in the drawings and foregoing description, such illustration and description are to be considered illustrative or exemplary and not restrictive; the invention is not limited to the disclosed embodiments. Alternative embodiments of the present invention may differ as regards, at least, the source signal distribution estimation, the fineness of the quantization cells, the distortion measure, the choice of reconstruction distribution and the algorithm for sampling the reconstruction distribution.

Other variations to the disclosed embodiments can be understood and effectuated by those skilled in the art in practicing the claimed invention, from a study of the drawings, the disclosure, and the appended claims. In the claims, the word 'comprising' does not exclude other elements or steps, and the indefinite article 'a' or 'an' does not exclude a plurality. A single processor or other unit may fulfil the functions of several items received in the claims. The mere fact that certain measures are recited in mutually different dependent claims does not indicate that a combination of these measured cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

List of Embodiments

1. A method for decoding a source signal encoded as a sequence of quantization indices, each quantization index referring to a quantization cell containing a corresponding source signal value and belonging to a partition into quantization cells, the method including:

generating, for each quantization index, a reconstructed signal value by sampling a reconstruction probability distribution wherein said reconstructed signal value lies in the quantization cell indicated by the quantization index.

2. A method according to embodiment 1, further including:

receiving an estimated probability distribution of the source signal, wherein the reconstruction probability distribution corresponds to the estimated probability distribution of the source signal.

3. A method according to embodiment 1, further including:

receiving an estimated probability distribution of the source signal; and determining said reconstruction probability distribution based on the estimated probability distribution of the source signal and in such manner that a quantization error is minimized.

4. A method according to embodiment 1, wherein said quantization cells are delimited by values $b_0, b_1, b_2, \ldots, b_M$ and the reconstruction probability distribution is proportional to $[\theta_i (x-E_i)^2-1]^{-1}$ in the ith cell, where $E_i$ denotes a conditional expectation of the source signal in the ith cell, and $b_0, b_1, \ldots, b_M, \theta_1, \theta_2, \ldots, \theta_M$ are solutions of $$\min_{b_0,b_1,\ldots,b_M,\theta_1,\theta_2,\ldots,\theta_M} D$$

subject to $$\overline{K} < T$$

and $$R < N,$$

where D denotes a mean squared quantization error, $\overline{K}$ denotes the relative entropy between the estimated probability distribution of the source signal and the reconstruction distribution, R is a minimum bit rate and T, N are predetermined constants.

5. A decoder (260) for decoding a source signal encoded as a sequence of quantization indices, each quantization index referring to a cell containing a corresponding source signal value and belonging to a partition into quantization cells, which decoder comprises:

a first receiving section for receiving a quantization index; and a random number generator for generating a reconstructed signal value by sampling a reconstruction probability distribution, said random number generator being adapted to generate a reconstructed signal value lying in the quantization cell indicated by the quantization index.

6. A decoder according to embodiment 5, further comprising a second receiving section for receiving an estimated probability distribution of the source signal, wherein the random number generator is adapted to use a reconstruction probability distribution corresponding to the estimated probability distribution of the source signal.

7. A decoder according to embodiment 5, further comprising:

a second receiving section for receiving an estimated probability distribution of the source signal; and means for determining said reconstruction probability distribution based on the estimated probability distribution of the source signal and in such manner that a quantization error is minimized.

8. A decoder according to embodiment 5, wherein said quantization cells are delimited by values $b_0, b_1, b_2, \ldots, b_M$ and the reconstruction probability distribution is proportional to $[\theta_i (x-E_i)^2-1]^{-1}$ in the ith cell, where $E_i$ denotes a conditional expectation of the source signal in the ith cell, and $b_0, b_1, \ldots, b_M, \theta_1, \theta_2, \ldots, \theta_M$ are solutions of $$\min_{b_0,b_1,\ldots,b_M,\theta_1,\theta_2,\ldots,\theta_M} D$$

subject to $$\overline{K} < T$$

and $$R < N,$$

where D denotes the mean squared quantization error, $\overline{K}$ denotes the relative entropy between the estimated probability distribution of the source signal and the reconstruction distribution, R is a minimum bit rate and T, N are predetermined constants.

9. A decoder according to any one of embodiments 5 to 8, wherein source signal values, quantization indices and reconstructed signal values are n-dimensional vectors, n being an integer greater than 1.

10. A method for encoding a source signal consisting of a sequence of source signal values, the method including:

receiving an estimated probability distribution of the source signal;

determining, in part, a partition into quantization cells by minimizing the quantization error subject to a constraint on a measure of the difference between the estimated probability distribution of the source signal and the reconstruction distribution; and assigning to each source signal value a quantization index referring to one cell, which contains the source signal value, in said partition into quantization cells.

11. A method according to embodiment 10, wherein said measure of the difference between the estimated probability distribution of the source signal and the reconstruction distribution is a relative entropy between the estimated probability distribution of the source signal and the reconstruction probability distribution.

12. A computer-readable medium having stored thereon computer-readable instructions which, when executed on general-purpose computer, perform the method of any one of embodiments 1 to 4, 10 and 11.

13. A method according to any one of embodiments 1 to 4 and 10 to 12, wherein source signal values and quantization indices are n-dimensional vectors, n being an integer greater than 1.

14. An encoder (250) for encoding a source signal consisting of a sequence of source signal values, the encoder including:

an optimizing section (211) adapted to receive an estimated probability distribution of the source signal and to determine, in part, a partition into quantization cells by minimizing the quantization error subject to a constraint on a measure of the difference between the estimated probability distribution of the source signal and the reconstruction distribution; and an encoding section (212) for assigning to each source signal value a quantization index referring to one cell, which contains the source signal value, in said partition into quantization cells.

15. An encoder according to embodiment 14, wherein said measure of the difference between the estimated probability distribution of the source signal and the reconstruction distribution is a relative entropy between the estimated probability distribution of the source signal and the reconstruction probability distribution.

16. An encoder according to embodiment 14 or 15, wherein said quantization cells are delimited by values $b_0$, $b_1$, $b_2$, . . . , $b_M$, which are solutions of $$\min_{b_0, b_1, \ldots, b_M, \theta_1, \theta_2, \ldots, \theta_M} D$$

subject to $$\overline{K} < T$$

and $$R < N,$$

where D denotes the mean squared quantization error, $\overline{K}$ denotes the relative entropy between the estimated probability distribution of the source signal and the reconstruction distribution, R is a minimum bit rate and T, N are predetermined constants.

17. An encoder according to any one of embodiments 14 to 16, wherein source signal values and quantization indices are n-dimensional vectors, n being an integer greater than 1.

The invention claimed is:

1. A method for decoding an audio or video source signal encoded as a sequence of quantization indices, each quantization index referring to a quantization cell containing a corresponding source signal value and belonging to a partition into quantization cells, the method including one of the following steps:

a) receiving an estimated probability distribution of the source signal and determining a reconstruction probability distribution based on the estimated probability distribution of the source signal by an optimization process tending to minimize a quantization error; and b) receiving the reconstruction probability distribution obtainable by an optimization process tending to minimize a weighted sum of at least a first term and a second term, wherein the first term is a quantization error and the second term is the difference between the source signal probability distribution and the reconstruction probability distribution, wherein the method further includes the step of generating, for each quantization index, a reconstructed signal value by sampling the reconstruction probability distribution wherein said reconstructed signal value lies in the quantization cell indicated by the quantization index.

2. A method according to claim 1, wherein the quantization error is measured in the mean-squared sense.

3. A method according to claim 1, wherein said quantization cells are delimited by values $b_0$, $b_1$, $b_2$, . . . , $b_M$ and the reconstruction probability distribution is proportional to $[\theta_i(x-E_i)^2-1]^{-1}$ in the ith cell, where $E_i$ denotes a conditional expectation of the source signal in the ith cell, and $b_0$, $b_1$, $b_2$, . . . , $b_M$, $\theta_1$, $\theta_2$, . . . $\theta_M$ are solutions of $$\min_{b_0, b_1, \ldots, b_M, \theta_1, \theta_2, \ldots, \theta_M} D$$

subject to $$\overline{K} < T$$

and $$R < N,$$

where D denotes a mean squared quantization error, $\overline{K}$ denotes the relative entropy between the estimated probability distribution of the source signal and the reconstruction probability distribution, R is a minimum bit rate and T, N are predetermined constants.

4. A method according to claim 1, wherein said quantization cells are delimited by values $b_0$, $b_1$, $b_2$, . . . , $b_M$ and the reconstruction probability distribution is proportional to $[\theta_i(x-E_i)^2+1]^{-1}$ in the ith cell, where $E_i$ denotes a conditional expectation of the source signal in the ith cell, and $b_0$, $b_1$, $b_2$, . . . , $b_M$, $\theta_1$, $\theta_2$, . . . $\theta_M$ are solutions of $$\min_{b_0, b_1, \ldots, b_M, \theta_1, \theta_2, \ldots, \theta_M} \overline{K}$$

subject to $$D < T'$$

and $$R < N,$$

where D denotes a mean squared quantization error, $\overline{K}$ denotes the relative entropy between the estimated probability distribution of the source signal and the reconstruction probability distribution, R is a minimum bit rate and T', N are predetermined constants.

5. A non-transitory computer-readable medium having stored thereon computer-readable instructions which, when executed on a general-purpose computer, perform the method of claim 1.

6. A method according to claim 1, wherein source signal values and quantization indices are n-dimensional vectors, n being an integer greater than 1.

7. A decoder for decoding an audio or video source signal encoded as a sequence of quantization indices, each quantization index referring to a cell containing a corresponding source signal value and belonging to a partition into quantization cells, which decoder comprises:

a first receiving section for receiving a quantization index;

a second receiving section for receiving a probability distribution, which is either:

a) an estimated probability distribution of the source signal, or b) a reconstruction probability distribution;

optional means for determining a reconstruction probability distribution, based on the estimated probability distribution of the source signal received by the second receiving section, by minimizing a sum of at least at first term and a second term, wherein the first term is a quantization error and the second term is the difference between the source signal probability distribution and the reconstruction probability distribution; and a random number generator for generating a reconstructed signal value by sampling the reconstruction probability distribution, said random number generator being adapted to generate the reconstructed signal value lying in the quantization cell indicated by the quantization index.

8. A decoder according to claim 7, wherein the quantization error is measured in the mean-squared sense.

9. A decoder according to claim 7, wherein said quantization cells are delimited by values $b_0$, $b_1$, $b_2$, . . . , $b_M$ and the reconstruction probability distribution is proportional to $[\theta_i(x-E_i)^2-1]^{-1}$ in the ith cell, where $E_i$ denotes a conditional expectation of the source signal in the ith cell, and $b_0$, $b_1$, $b_2$, . . . , $b_M$, $\theta_1$, $\theta_2$, . . . $\theta_M$ are solutions of $$\min_{b_0, b_1, \ldots, b_M, \theta_1, \theta_2, \ldots, \theta_M} D$$

subject to $$\overline{K} < T$$

and $$R < N,$$

where D denotes the mean squared quantization error, $\overline{K}$ denotes the relative entropy between the estimated probability distribution of the source signal and the reconstruction probability distribution, R is a minimum bit rate and T, N are predetermined constants.

10. A decoder according to claim 7, wherein said quantization cells are delimited by values $b_0$, $b_1$, $b_2$, . . . , $b_M$ and the reconstruction probability distribution is proportional to $[\theta_i (x-E_i)^2+1]^{-1}$ in the ith cell, where $E_i$ denotes a conditional expectation of the source signal in the ith cell, and $b_0$, $b_1$, $b_2$, . . . , $b_M$, $\theta_1$, $\theta_2$, . . . $\theta_M$ are solutions of $$\min_{b_0, b_1, \ldots, b_M, \theta_1, \theta_2, \ldots, \theta_M} \overline{K}$$

subject to $$D < T'$$

and $$R < N,$$

where D denotes the mean squared quantization error, K denotes the relative entropy between the estimated probability distribution of the source signal and the reconstruction probability distribution, R is a minimum bit rate and T', N are predetermined constants.

11. A decoder according to claim 7, wherein source signal values, quantization indices and reconstructed signal values are n-dimensional vectors, n being an integer greater than 1.

* * * * *